US012600803B2

(12) United States Patent
Curren, Sr. et al.

(10) Patent No.: US 12,600,803 B2
(45) Date of Patent: Apr. 14, 2026

(54) SYSTEMS AND TECHNIQUES FOR HEAT REMOVAL IN GAS PHASE POLYMERIZATION

(71) Applicant: Chevron Phillips Chemical Company LP, The Woodlands, TX (US)

(72) Inventors: Joseph A. Curren, Sr., Houston, TX (US); Kenneth A. Dooley, Porter, TX (US); Jeffrey S. Lowell, Huffman, TX (US)

(73) Assignee: Chevron Phillips Chemical Company LP, The Woodlands, TX (US)

( * ) Notice: Subject to any disclaimer, the term of this patent is extended or adjusted under 35 U.S.C. 154(b) by 640 days.

(21) Appl. No.: 18/068,887

(22) Filed: Dec. 20, 2022

(65) Prior Publication Data

US 2024/0199768 A1 Jun. 20, 2024

(51) Int. Cl.
| | |
|---|---|
| *C08F 2/01* | (2006.01) |
| *C08F 4/02* | (2006.01) |
| *C08F 4/78* | (2006.01) |
| *C08F 6/12* | (2006.01) |
| *C08F 10/02* | (2006.01) |

(52) U.S. Cl.
CPC .................. *C08F 2/01* (2013.01); *C08F 4/02* (2013.01); *C08F 4/78* (2013.01); *C08F 6/12* (2013.01); *C08F 10/02* (2013.01)

(58) Field of Classification Search
CPC ...... C08F 2/01; C08F 4/02; C08F 4/78; C08F 6/12; C08F 10/02; C08F 6/10; C08F 110/02; C08F 210/16
See application file for complete search history.

(56) References Cited

U.S. PATENT DOCUMENTS

| | | | |
|---|---|---|---|
| 6,063,877 A | 5/2000 | Kocian | |
| 6,391,985 B1 | 5/2002 | Goode | |
| 6,627,713 B2 | 9/2003 | Bernier | |
| 7,531,606 B2 | 5/2009 | Hendrickson | |
| 7,696,289 B2 | 4/2010 | Fischbuch | |
| 8,835,576 B2 | 9/2014 | Force | |
| 9,718,896 B2 | 8/2017 | Hari | |
| 11,186,662 B1 * | 11/2021 | Kufeld | C08F 210/16 |
| 2003/0153695 A1 * | 8/2003 | Braganca | C08F 10/02 526/901 |
| 2019/0218318 A1 * | 7/2019 | Brandl | C08F 210/02 |

OTHER PUBLICATIONS

IUPAC Compendium of Chemical Terminology, 2nd Ed. 1997, pp. 1-1670.

* cited by examiner

*Primary Examiner* — Kumar R Bhushan
(74) *Attorney, Agent, or Firm* — Eversheds Sutherland LLP

(57) ABSTRACT

A technique of operating a gas phase fluidized bed polymerization reactor system may include feeding an olefin monomer and catalyst to a polymerization reactor. The monomer and the catalyst are contacted in a fluidized bed in the reactor to form a product including a polyolefin. A heat of polymerization is extracted from the reactor by recycling an inert condensable agent through the fluidized bed and condensing the inert condensable agent. The product is discharged from the reactor. The inert condensable agent includes propane, n-butane, or isobutane in a total mole fraction of greater than or equal to 0.50 of the inert condensable agent. A system including a gas phase fluidized bed polymerization reactor system may include a source of propane, n-butane, or isobutane for introduction into the polymerization system as an inert condensable agent. A loop slurry polymerization reactor system outlet may be the source of isobutane or propane.

25 Claims, 7 Drawing Sheets

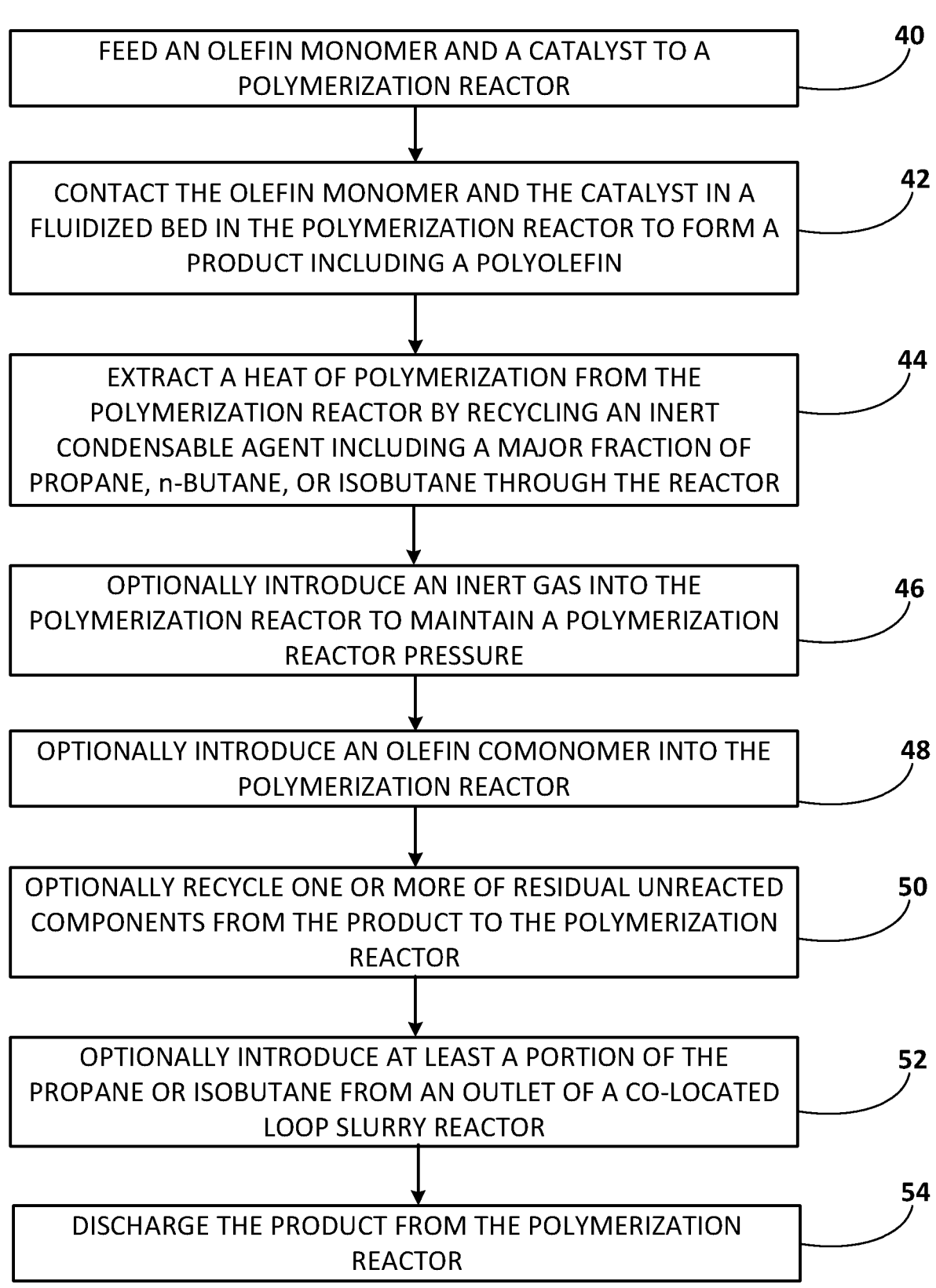

FEED AN OLEFIN MONOMER AND A CATALYST TO A POLYMERIZATION REACTOR — 40

CONTACT THE OLEFIN MONOMER AND THE CATALYST IN A FLUIDIZED BED IN THE POLYMERIZATION REACTOR TO FORM A PRODUCT INCLUDING A POLYOLEFIN — 42

EXTRACT A HEAT OF POLYMERIZATION FROM THE POLYMERIZATION REACTOR BY RECYCLING AN INERT CONDENSABLE AGENT INCLUDING A MAJOR FRACTION OF PROPANE, n-BUTANE, OR ISOBUTANE THROUGH THE REACTOR — 44

OPTIONALLY INTRODUCE AN INERT GAS INTO THE POLYMERIZATION REACTOR TO MAINTAIN A POLYMERIZATION REACTOR PRESSURE — 46

OPTIONALLY INTRODUCE AN OLEFIN COMONOMER INTO THE POLYMERIZATION REACTOR — 48

OPTIONALLY RECYCLE ONE OR MORE OF RESIDUAL UNREACTED COMPONENTS FROM THE PRODUCT TO THE POLYMERIZATION REACTOR — 50

OPTIONALLY INTRODUCE AT LEAST A PORTION OF THE PROPANE OR ISOBUTANE FROM AN OUTLET OF A CO-LOCATED LOOP SLURRY REACTOR — 52

DISCHARGE THE PRODUCT FROM THE POLYMERIZATION REACTOR — 54

FIG. 2

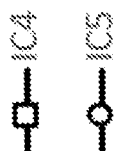
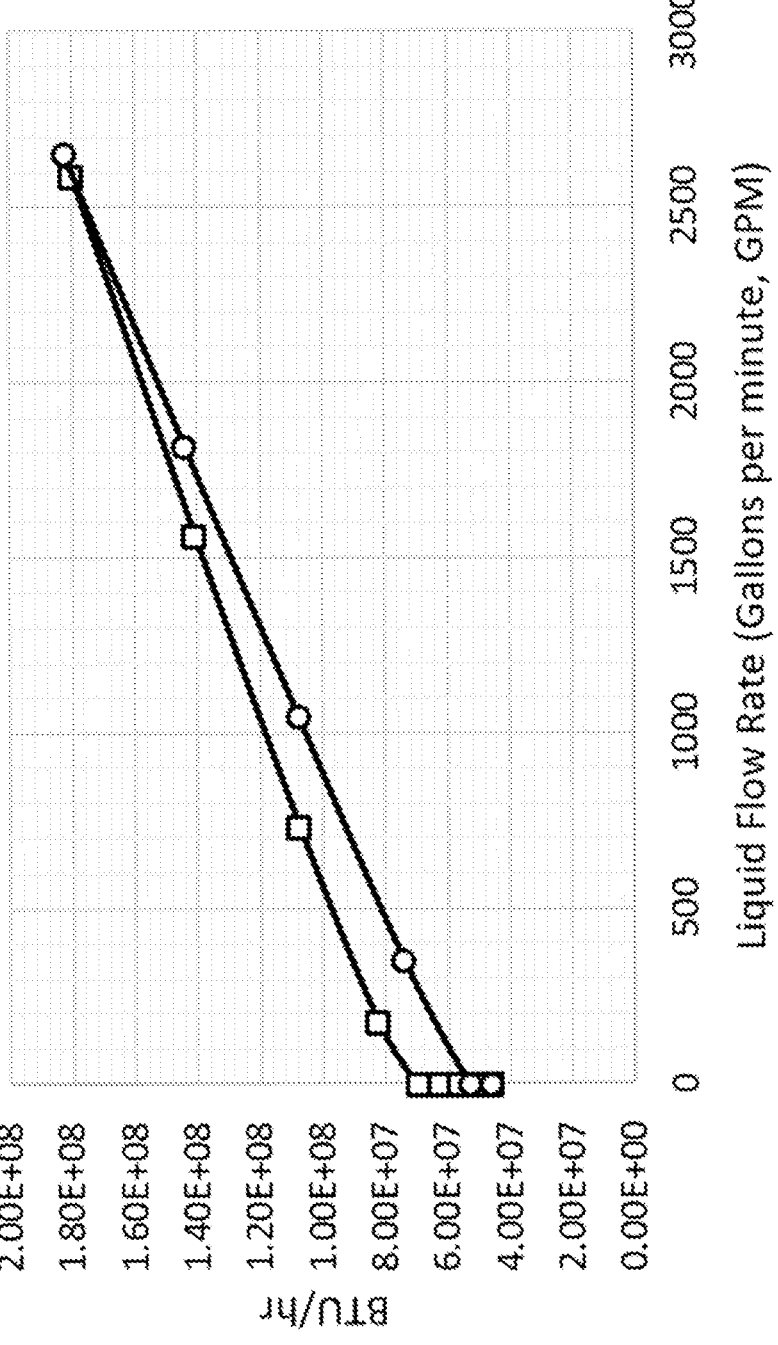
FIG. 3

SYSTEMS AND TECHNIQUES FOR HEAT REMOVAL IN GAS PHASE POLYMERIZATION

CROSS REFERENCE TO RELATED APPLICATIONS

None.

TECHNICAL FIELD

This disclosure relates to systems and techniques for polymerization, and in particular, to systems and techniques for removing heat from gas phase polymerization reactors.

BACKGROUND

Single- or multiple-reactor systems may be used to produce polymer resins, such as polyethylene. For example, polyethylene may be produced using loop slurry reactors or gas phase reactors. Olefin polymerization generates heat of reaction. In gas phase reactors, heat is extracted from the reactor to permit continued polymerization while maintaining the reactor temperature in an acceptable temperature range. In reactors operated in a condensed mode, an inert condensable agent is circulated through the reactor to extract heat.

A need remains for new and improved systems and techniques for removing heat from gas phase polymerization reactors.

SUMMARY OF THE DISCLOSURE

This summary is provided to introduce various concepts in a simplified form that are further described below in the detailed description. This summary is not intended to identify required or essential features of the claimed subject matter nor is the summary intended to limit the scope of the claimed subject matter.

In aspects, the present disclosure describes a technique of operating a gas phase fluidized bed polymerization reactor system. The technique includes feeding an olefin monomer and a catalyst to a polymerization reactor. The technique further includes contacting the olefin monomer and the catalyst in a fluidized bed in the polymerization reactor to form a product including a polyolefin. The technique further includes extracting a heat of polymerization from the polymerization reactor by recycling an inert condensable agent through the fluidized bed and condensing the inert condensable agent. The technique further includes discharging the product from the polymerization reactor. The inert condensable agent includes one or more of propane, n-butane, or isobutane in a total mole fraction of greater than or equal to 0.50 of the inert condensable agent.

In aspects, the present disclosure describes a system including a gas phase fluidized bed polymerization reactor system configured to polymerize an olefin monomer when in contact with a catalyst. The system further includes a source of propane, n-butane, or isobutane fluidically coupled to the gas phase fluidized polymerization reactor system for introducing one or more of propane, n-butane, or isobutane into the gas phase fluidized bed polymerization system as an inert condensable agent.

In aspects, the present disclosure describes a system including a loop slurry polymerization reactor system including an outlet for isobutane. The system further includes a gas phase fluidized bed polymerization reactor system configured to polymerize an olefin monomer over a catalyst. The outlet of the loop slurry polymerization system is fluidically coupled to the gas phase fluidized polymerization reactor system for introducing isobutane from the loop slurry polymerization system into the gas phase fluidized bed polymerization system as an inert condensable agent.

In aspects, the present disclosure describes a system including a loop slurry polymerization reactor system including an outlet including isobutane. The system further includes a gas phase fluidized bed polymerization reactor system configured to polymerize an olefin monomer over a catalyst. The outlet of the loop slurry polymerization system is fluidically coupled to the gas phase fluidized polymerization reactor system for introducing isobutane from the loop slurry polymerization system into the gas phase fluidized bed polymerization system as an inert condensable agent.

In aspects, the present disclosure describes a system including a loop slurry polymerization reactor system including an outlet including propane. The system further includes a gas phase fluidized bed polymerization reactor system configured to polymerize an olefin monomer over a catalyst. The outlet of the loop slurry polymerization system is fluidically coupled to the gas phase fluidized polymerization reactor system for introducing propane from the loop slurry polymerization system into the gas phase fluidized bed polymerization system as an inert condensable agent.

This summary and the following detailed description provide examples and are explanatory only of the disclosure. Accordingly, the foregoing summary and the following detailed description should not be considered to be restrictive. Additional features or variations thereof can be provided in addition to those set forth herein, such as for example, various feature combinations and sub-combinations of these described in the detailed description.

BRIEF DESCRIPTION OF THE DRAWINGS

The following figures form a part of the present disclosure and are included to further demonstrate certain aspects of the present invention. The invention may be better understood by reference to one or more of these figures in combination with the detailed description of the specific embodiments presented herein.

FIG. 2 is a flow diagram showing a technique for extracting heat of reaction from a gas phase polymerization system.

FIG. 3 is a chart showing a relationship between heat removal rate and condensable flow rate in simulations of high-density polyethylene production using isobutane and isopentane as respective inert condensable agents.

Figure 1:
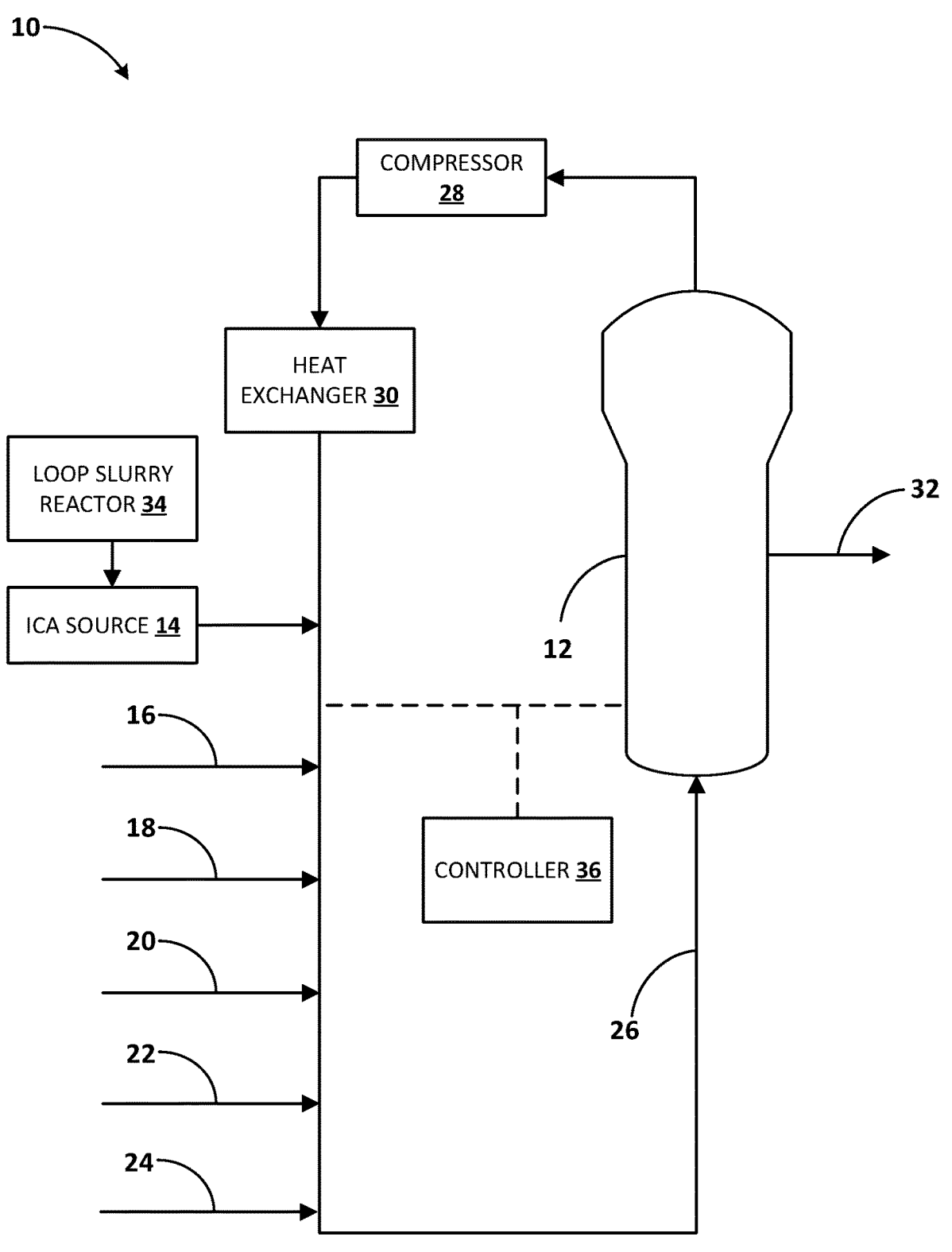
FIG. 1 is a conceptual diagram showing a polymerization system including a gas phase polymerization reactor coupled to an inert condensable agent (ICA) source.

While the inventions disclosed herein are susceptible to various modifications and alternative forms, only a few specific aspects have been shown by way of example in the drawings and are described in detail below. The figures and detailed descriptions of these specific aspects are not intended to limit the breadth or scope of the inventive concepts or the appended claims in any manner. Rather, the figures and detailed written descriptions are provided to illustrate the inventive concepts to a person of ordinary skill in the art and to enable such person to make and use the inventive concepts.

DETAILED DESCRIPTION

It is to be understood that the disclosure is not limited in its application to the details of construction and the arrangement of components set forth in the following description or illustrated in the drawings.

Definitions

To define more clearly the terms used herein, the following definitions are provided. Unless otherwise indicated, the following definitions are applicable to this disclosure. If a term is used in this disclosure but is not specifically defined herein, the definition from the IUPAC Compendium of Chemical Terminology, 2nd Ed (1997) can be applied, as long as that definition does not conflict with any other disclosure or definition applied herein, or render indefinite or non-enabled any claim to which that definition is applied. To the extent that any definition or usage provided by any document incorporated herein by reference conflicts with the definition or usage provided herein, the definition or usage provided herein controls.

While compositions and techniques are described in terms of "comprising" various components or steps, the compositions and techniques can also "consist essentially of" or "consist of" the various components or steps, unless stated otherwise.

The terms "a," "an," and "the" are intended to include plural alternatives, e.g., at least one. The terms "including", "with", and "having", as used herein, are defined as comprising (i.e., open language), unless specified otherwise.

Various numerical ranges are disclosed herein. When Applicant discloses or claims a range of any type, Applicant's intent is to disclose or claim individually each possible number that such a range could reasonably encompass, including end points of the range as well as any sub-ranges and combinations of sub-ranges encompassed therein, unless otherwise specified. For example, all numerical end points of ranges disclosed herein are approximate, unless excluded by proviso.

Values or ranges may be expressed herein as "about," for example, from "about" one particular value, and/or to "about" another particular value. When such values or ranges are expressed, other embodiments disclosed include the specific value recited, from the one particular value, and/or to the other particular value. Similarly, when values are expressed as approximations, by use of the antecedent "about," it will be understood that the particular value forms another embodiment. It will be further understood that there are a number of values disclosed therein, and that each value is also herein disclosed as "about" that particular value in addition to the value itself. In another aspect, use of the term "about" means±20% of the stated value, ±15% of the stated value, ±10% of the stated value, ±5% of the stated value, ±3% of the stated value, or ±1% of the stated value.

For any particular compound disclosed herein, when a general compound formula or name is presented such as $C_5H_{12}$, "pentane", or "pentanes", it is intended that the general formula or name can encompass all structural isomers, conformational isomers, regioisomers, and stereoisomers which can arise from a particular formula, name, or set of substituents, unless indicated otherwise, or unless the context is contrary to encompassing all isomers. For example, a general reference to $C_5H_{12}$, or "pentanes" includes n-pentane, isopentane (2-methyl-butane), and 2,2-dimethylpropane, if the context permits. Similarly, a general reference to a $C_4H_9$ group or a "butyl group" includes an n-butyl group, a sec-butyl group, an iso-butyl group, and a tert-butyl group unless the context requires otherwise. Additionally, the reference to a general structure or name encompasses all enantiomers, diastereomers, and other optical isomers whether in enantiomeric or racemic forms, as well as mixtures of stereoisomers, as the context permits or requires.

Applicant reserves the right to proviso out or exclude any individual members of any such group of values or ranges, including any sub-ranges or combinations of sub-ranges within the group, that can be claimed according to a range or in any similar manner, if for any reason Applicant chooses to claim less than the full measure of the disclosure, for example, to account for a reference that Applicant may be unaware of at the time of the filing of the application. Further, Applicant reserves the right to proviso out or exclude any individual substituents, analogs, compounds, ligands, structures, or groups thereof, or any members of a claimed group, if for any reason Applicant chooses to claim less than the full measure of the disclosure, for example, to account for a reference that Applicant may be unaware of at the time of the filing of the application.

For the purposes of this disclosure, "inert condensable agent" (also known as "induced condensable agent") when used in the context of a fluidized bed polymerization reactor refers to a hydrocarbon that can be compressed and cooled to below a dew point of a gas phase in a fluidized bed and injected in the fluidized bed to be vaporized to remove a heat of polymerization.

Although any techniques and materials similar or equivalent to those described herein can be used in the practice or testing of the invention, the typical techniques and materials are herein described.

All publications and patents mentioned herein are incorporated herein by reference for the purpose of describing and disclosing, for example, the constructs and methodologies that are described in the publications, which might be used in connection with the presently described invention. The publications discussed throughout the text are provided solely for their disclosure prior to the filing date of the present application. Nothing herein is to be construed as an admission that the inventors are not entitled to antedate such disclosure by virtue of prior invention.

The present disclosure generally relates to systems and techniques for gas phase polymerization, and in particular, for heat removal from gas phase reactors using n-butane or isobutane as an inert condensable agent.

Gas phase polymerization, for example, in polyolefin production, may generate substantial heat of reaction. Heat may be extracted from gas phase polymerization reactors using inert condensable agents (ICAs). For example, a pentane (for example, n-pentane or isopentane), alone or in combination with isobutane or propane may be used as an inert condensable agent.

Instead of isopentane or n-pentane, one or more of propane, n-butane, or isobutane may be used as a major component of, or substantially the sole component of, inert condensable agents. A major component of an inert condensable agent total is an agent having a mole fraction of 0.5 or more of the inert condensable agent. Using a majority of propane, n-butane, or isobutane may provide certain advantages. In some aspects, only propane is present in the inert condensable agent in a mole fraction of 0.5 or greater. In some aspects, only n-butane is present in the inert condensable agent in a mole fraction of 0.5 or greater. In some aspects, only isobutane is present in the inert condensable agent in a mole fraction of 0.5 or greater. In some aspects, both n-butane and isobutane are present in the inert condensable agent with a total mole fraction of 0.5 or greater. For example, isobutane is more volatile than pentanes. Thus, isobutane condenses less for a given pressure, temperature, or partial pressure. For a given set of reaction conditions, isobutane also condenses/sorbs less into the polymerization product (for example, polyolefin, or polyethylene in particular) in the gas phase reactor bed. Because of the higher volatility, a higher partial pressure of isobutane may be used (compared to pentanes) before reactor constraints are reached. The reactor constraints may be include a constraint of liquid re-injection (for example, pumped liquid re-injection) or maximum hydrocarbon sorption level in the polyolefin. Using a higher partial pressure of isobutane allows a greater degree of heat removal, because the additional isobutane in the gas phase composition increases the heat capacity, enabling a greater degree of heat transfer for a given loop gas velocity and reactor inlet/outlet temperatures.

Using propane or isobutane is also advantageous because other polymerization systems (such as loop slurry polymerization reactors) may include propane or isobutane in waste streams or output streams, and co-located loop slurry systems may be used as a source of isobutane for use as inert condensable agents in gas phase systems. For example, a light inert vent from a loop slurry system may include unreacted ethylene, inert ethane, and uncondensed waste isobutane or propane. A stream from the vent may be treated for catalyst poisons (such as water or alcohols) and directly introduced in a gas phase reactor, allowing for further conversion of waste ethylene as well as productive use of the ethane and isobutane components of the loop reactor waste stream. This could displace inert nitrogen and increase the concentrations of beneficial ethane and propane or isobutane in the gas phase reactor.

In aspects, the present disclosure describes a technique of operating a gas phase fluidized bed polymerization reactor system. The technique includes feeding an olefin monomer and a catalyst to a polymerization reactor. The technique further includes contacting the olefin monomer and the catalyst in a fluidized bed in the polymerization reactor to form a product including a polyolefin. The technique further includes extracting a heat of polymerization from the polymerization reactor by recycling an inert condensable agent through the fluidized bed and condensing the inert condensable agent. The technique further includes discharging the product from the polymerization reactor. The inert condensable agent includes propane, n-butane, or isobutane in a total mole fraction of greater than or equal to 0.50 of the inert condensable agent.

In aspects, the present disclosure describes a system including a gas phase fluidized bed polymerization reactor system configured to polymerize an olefin monomer over a catalyst. The system further includes a source of propane, n-butane, or isobutane fluidically coupled to the gas phase fluidized polymerization reactor system for introducing one or more of propane, n-butane, or isobutane into the gas phase fluidized bed polymerization system as an inert condensable agent.

In aspects, the present disclosure describes a system including a loop slurry polymerization reactor system including an outlet including isobutane. The system further includes a gas phase fluidized bed polymerization reactor system configured to polymerize an olefin monomer over a catalyst. The outlet of the loop slurry polymerization system is fluidically coupled to the gas phase fluidized polymerization reactor system for introducing isobutane from the loop slurry polymerization system into the gas phase fluidized bed polymerization system as an inert condensable agent.

In aspects, the present disclosure describes a system including a loop slurry polymerization reactor system including an outlet including propane. The system further includes a gas phase fluidized bed polymerization reactor system configured to polymerize an olefin monomer over a catalyst. The outlet of the loop slurry polymerization system is fluidically coupled to the gas phase fluidized polymerization reactor system for introducing propane from the loop slurry polymerization system into the gas phase fluidized bed polymerization system as an inert condensable agent.

FIG. 1 is a conceptual diagram showing a polymerization system 10 including a gas phase polymerization reactor 12 coupled to an inert condensable agent (ICA) source 14. The reactor 12 may be a gas phase fluidized bed polymerization reactor. The gas phase polymerization reactor 12 is configured to polymerize an olefin monomer over a catalyst. The reactor product includes a polyolefin. For example, the olefin monomer may include ethylene, and the polyolefin may include polyethylene.

The polymerization system 10 may further include a source of propane, n-butane, or isobutane (inert condensable agent source, or ICA source) 14 fluidically coupled to the gas phase fluidized polymerization reactor 12 for introducing one or more of propane, n-butane, or isobutane into the gas phase fluidized bed polymerization reactor 12 as an inert condensable agent.

The olefin monomer may be fed to the reactor 12 in an olefin monomer line 16. The catalyst may be fed to the reactor 12 in a catalyst line 18. Optionally, a comonomer may be fed to the reactor 12 in a comonomer line 20. A chain terminating agent, for example, hydrogen may be fed in a line 22. Nitrogen may be fed as an inert agent (different from the inert condensable agent) in a nitrogen line 24. While these components are associated with different lines in system 10 of FIG. 1, in other aspects, one or more of these components may be combined and introduced in a same line. Further, one or more of these lines may be coupled to a fresh supply of the respective components, and/or recycle lines coupled to the reactor 12 for recycling unused respective components. One or more of these components may be directly fed to the reactor 12, or indirectly via a recycle line 26 for circulating components through reactor 12.

The polymerization system 10 may further include components for condensing and/or cooling one or more components (for example, the inert condensable agent) to be recycled to the reactor 12. For example, the polymerization system 10 may include a compressor 28 and a heat exchanger 30. In aspects, the compressor 28 and the heat exchanger 30 may be part of the recycle line 26. The compressor 28 and the heat exchanger 30 may cause at least the inert condensable agent (for example, including one or both of n-butane or isobutane) to be condensed and cooled, and then reintroduced in the polymerization reactor 12 to cool the contents of the polymerization reactor 12. Without being bound by theory, the condensed inert agent may be introduced in the polymerization reactor 12 at a temperature lower than the dew point associated with a gas phase present in the polymerization reactor 12. Vaporization of the condensed inert agent extracts the heat of polymerization, and the vaporized inert condensable agent may be recycled for continuous cycles of condensation and expansion through the polymerization reactor 12 via recycle line 26.

The polymerized polyolefin product, for example, polyethylene, may be withdrawn from the polymerization reactor in a product line 32. The product may be treated to extract residual unreacted components (for example, olefin, isobutane, or other components) from the product line 32 back to the reactor 12.

In aspects, the ICA source 14 provides a fresh supply of propane, n-butane, or isobutane to the reactor 12. In aspects in which propane or isobutane is present in the inert condensable agent, at least a portion of the propane or isobutane may be sourced from another reactor system. For example, a different polymerization system may generate a waste stream in which propane or isobutane may be present, and such a waste stream may be introduced as at least a portion of the isobutane. In some aspects, the polymerization system 10 includes a loop slurry reactor 34 coupled to the source of inert condensable agent 14, or replacing the source of inert condensable agent 14. For example, a waste stream of the loop slurry reactor 34 may include isobutane or propane, which may be reused as at least a portion of an inert condensable agent in the gas phase polymerization reactor 12. The loop slurry reactor 34 may include an outlet including isobutane or propane. The outlet of the loop slurry polymerization system 34 may be fluidically coupled to the gas phase fluidized polymerization reactor system 12 for introducing isobutane or propane from the loop slurry polymerization system 34 into the gas phase fluidized bed polymerization system 12 as an inert condensable agent. In some such aspects, the polymerization system 10 may further include a catalyst poison deactivation unit, for example, to treat the waste stream from the loop slurry reactor 34 to reduce or substantially remove catalyst poisons.

The system of FIG. 1 may use one or more of propane, n-butane, or isobutane as a major component of an inert condensable agent, for example being present in a total mole fraction of 0.5 or greater. For example, if both n-butane and isobutane are present, the sum of their respective mole fractions is 0.5 or greater. If only one of n-butane or isobutane is present, the respective mole fraction thereof is 0.5 or greater.

In some aspects, the inert condensable agent is absent of n-butane and isobutane. In such aspects, the inert condensable agent may consist of or consist essentially of propane. In some aspects, the inert condensable agent includes propane in a mole fraction of greater than or equal to 0.50 of the inert condensable agent. In some aspects, the inert condensable agent includes propane in a mole fraction of greater than or equal to 0.60 of the inert condensable agent. Propane has both a higher heat capacity as well as a higher molecular weight than nitrogen, thereby increasing the mass circulating in the reactor and recycle loop. Further, use of propane also increase the amount of heat that each pound of gas can hold over a given temperature change. Moreover, propane at sufficiently high concentrations, for example, greater than or equal to 0.50 mole fraction of the inert condensable agent, can serve the purpose of both a condensable agent and an inert gas in a gas phase process.

In aspects, replacing nitrogen with propane may more than double the capacity of a given reactor while eliminating the need for an additional condensing agent, and reducing the stickiness of the reactor product, improving the flowability of the product, and not requiring as low of a reactor inlet temperature.

Because propane may not be very soluble in the product, and the inert condensing agent is no longer needed if propane is used instead of nitrogen, the powder product may not have as much hydrocarbon sorbed into/onto it and will be less cohesive/sticky. This may improve the operability and operating limits of the reactor as well as makes the powder flowability in downstream equipment better.

Stripping of product from the reactor with ethylene in combination with the use of propane as the reactor inert may allow all flake stripping operations to return the resulting stripping streams directly to the reactor. Some preparation of "olefin free" or nearly "olefin free" propane may be used to reduce or minimize propane losses. A final stripping with nitrogen may be used to remove any residual ethylene, for example, in a way that reduces or minimizes the loss of ethylene and reduces or minimizes the use of nitrogen. Propane may provide a lower dewpoint of the feed stream compared to n-butane or isobutane.

The system 10 of FIG. 1 may include a controller 36 in operational communication with one or more components of system 10, for example, the reactor 12, the ICA source 14, the compressor 28, the heat exchanger 30, the loop slurry reactor 34, or any other component of system 10. The controller 36 may be configured to send control signals or communication signals that cause one or more components to perform predetermined functions or steps, including (i) starting or stopping flow of one or more streams, (ii) initiating, maintaining, or terminating conditions for polymerization, or (iii) maintaining or changing pressure, temperature, or other parameters in one or more components or streams.

The controller 36 may be implemented by any suitable computer system. The controller 36 may include one or more processors that execute instructions that are stored in one or more memory devices (also referred to as a memory). The instructions may be, for instance, instructions for implementing functionality described as being carried out by one or more modules and systems disclosed above or instructions for implementing one or more of the methods disclosed above. A processor can refer to an integrated circuit (IC), an ASIC, a digital signal processor (DSP), an FPGA, a PLC, a complex programmable logic device (CPLD), a discrete gate or transistor logic, discrete hardware components, or any combination thereof designed or otherwise configured (e.g., manufactured) to perform the functions described herein.

The one or more processors can access the memory by means of a communication architecture (e.g., a system bus). Memory components or memory devices disclosed herein can be embodied in either volatile memory or non-volatile memory or can include both volatile and non-volatile memory. In addition, the memory components or memory devices can be removable or non-removable, and/or internal or external to a computing device or component. In addition to storing executable instructions, the memory also can retain data.

The controller 36 may include a mass storage that is accessible by the one or more processors by means of the communication architecture. The mass storage may include machine-accessible instructions (e.g., computer-readable instructions and/or computer-executable instructions). Execution of the modules, individually or in combination, by the one more processors, can cause the controller 36 to perform any of the operations or techniques described herein.

The controller 36 may include one or more interface devices, which may include one or both of an input/output interface or a network interface that can permit or otherwise facilitate external devices to communicate with the controller 36. For instance, the interface may be used to receive and send data and/or instructions from and to an external computing device. The network interface devices may permit or otherwise facilitate functionally coupling the controller 36 with one or more devices or systems.

Controller 36 may perform various functions via hardware, a combination of hardware and software, software, or software in execution. The memory components or memory devices described herein embody or include non-transitory computer storage media that can be readable or otherwise accessible by a computing device. Such media can be implemented in any methods or technology for storage of information, such as machine-accessible instructions (e.g., computer-readable instructions), information structures, program modules, or other information objects Aspects of techniques for operating the system of FIG. 1 are described with reference to the flow diagram shown in FIG. 2. However, any suitable polymerization and heat removal technique may be used to operate the system of FIG. 1. One or more steps described with reference to FIG. 2 may be performed by the controller 36. For example, the controller 36 may control the system 10 to cause the system 10 to carry out one or more steps of a technique described with reference to FIG. 2.

FIG. 2 is a flow diagram showing a technique for extracting heat of reaction from a gas phase polymerization system. For convenience, the technique of FIG. 2 is described with reference to the polymerization system 10 of FIG. 1. However, the polymerization and heat removal technique of FIG. 2 may be practiced using any suitable polymerization system.

At step 40, the technique of FIG. 2 includes feeding an olefin monomer and a catalyst to the polymerization reactor 12. In aspects, the olefin monomer includes or is selected from ethylene or propylene. In some aspects, the olefin monomer consists of or consists essentially of ethylene. The olefin monomer may be fed through olefin monomer line 16, either via the recycle line 26, or directly to the polymerization reactor 12.

The catalyst may be fed either via the recycle line 26, for example, as catalyst particles fluidized in a carrier gas flowing through the recycle line 26, or directly to the polymerization reactor 12. In aspects, the catalyst includes a Ziegler-Natta catalyst, a chromium based catalyst, or a metallocene catalyst. In some aspects, the catalyst consists of a silica-supported chromium based catalyst. In aspects, the feeding the catalyst to the polymerization reactor 12 includes feeding a slurry of the catalyst in isobutane to the polymerization reactor 12. In some aspects, the feeding the catalyst to the polymerization reactor 12 includes continuous injecting of the slurry of the catalyst in isobutane in the polymerization reactor 12.

At step 42, the technique includes contacting the olefin monomer and the catalyst in a fluidized bed in the polymerization reactor 12 to form a product including a polyolefin. The polyolefin may include a polyethylene, for example, a low density polyethylene (LDPE), a linear low density polyethylene (LLDPE), or a high density polyethylene (HDPE). The polyolefin may include other polymers, for example, polypropylene, depending on the makeup of the monomer and other components fed to the polymerization reactor 12.

The polymerization reaction generates heat of reaction (heat of polymerization). If the heat of reaction is not removed at a sufficient rate from the polymerization reactor 12, the temperature of the polymerization reactor 12 and its contents may rise to unacceptable levels. For example, the temperatures may disadvantageously rise to beyond a softening point or a melting point of the polymer product, or even higher. To maintain the temperature of the polymerization reactor 12 in an acceptable range, heat may be extracted from the polymerization system 10. The polymerization reactor may be maintained at a suitable temperature range. In aspects, the polymerization reactor 12 is maintained within a temperature range of 75° C. to 115° C. In some such aspects, the temperature range is 75° C. to 95° C. In some aspects, the temperature range is 90° C. to 115° C.

At step 44, the technique of FIG. 2 includes extracting a heat of polymerization from the polymerization reactor 12 by recycling an inert condensable agent through the fluidized bed and condensing the inert condensable agent. The inert condensable agent includes propane, n-butane, or isobutane in a total mole fraction of greater than or equal to 0.50 of the inert condensable agent. In some aspects, the inert condensable agent only includes one of propane, n-butane, or isobutane, and does not include the other of propane, n-butane, or isobutane. In some aspects, the inert condensable agent consists essentially of or consists of n-butane. In some aspects, the inert condensable agent consists essentially of or consists of isobutane. In some aspects, the inert condensable agent consists essentially of or consists of propane.

In some aspects, the n-butane or isobutane is present in a total mole fraction of greater than or equal to 0.80 of the inert condensable agent. In some aspects, the n-butane or isobutane is present in a total mole fraction of greater than or equal to 0.90 of the inert condensable agent. In some aspects, the n-butane or isobutane is present in a mole fraction of greater than or equal to 0.95 of the inert condensable agent. In some aspects, the inert condensable agent comprises less than 1 parts per million by weight (ppmw) of oxygen. In some aspects, the inert condensable agent comprises less than 5 ppmw of hydrogen. In some aspects, the inert condensable agent consists of or consists essentially of isobutane. In some aspects, the inert condensable agent is absent non-hydrocarbon agents. In some aspects, the inert condensable agent is absent n-pentane or isopentane. In aspects, no inert agent other than the inert condensable agent is introduced into the polymerization reactor.

The efficiency of heat removal may be determined in terms of a heat removal rate, or a heat removal rate ratio or index relative to a base heat removal rate. For example, a heat removal index $Q/Q_{base}$ may be determined. Q is a heat removal capability associated with the inert condensable agent. $Q_{Base}$ is a heat removal capability associated with a combination of nitrogen and n-pentane sufficient to produce a total partial pressure ratio $P/P^{sat}$ of 0.90. In some aspects, the heat removal index $Q/Q_{Base}$ is greater than 0.6. In some such aspects, the heat removal index $Q/Q_{Base}$ is greater than 0.8. In some aspects, the heat removal index $Q/Q_{Base}$ is greater than 0.9. In some aspects, the heat removal index $Q/Q_{Base}$ is greater than 1. In some aspects, the heat removal index $Q/Q_{Base}$ is greater than 1 at a total partial pressure ratio $P/P^{sat}$ of 0.9 or less. $P/P^{sat}$ is the sum of partial pressures of each condensable hydrocarbon in the polymerization reactor divided by a respective saturation pressure. In some aspects, the heat removal index $Q/Q_{Base}$ is less than 1.5.

In some aspects, the inert condensable agent consists of or consists essentially of isobutane, and where a heat removal index $Q_{butane}/Q_{pentane}$ is greater than 1.0 for a condensate circulation rate of less than 2500 gallons per minute (GPM). $Q_{butane}$ is a heat removal capability associated with the isobutane inert condensable agent, and $Q_{pentane}$ is a heat removal capability associated with isopentane under the same reaction conditions as isobutane. In some such aspects, the heat removal index $Q/Q_{Base}$ is greater than or equal to 1.1. In some such aspects, the condensate circulation rate is less than 1500 GPM. In some such aspects, the condensate circulation rate is less than 500 GPM.

In some aspects, the heat removal rate is greater than $1.00 \times 10^8$ BTU/hr at a total partial pressure ratio $P/P^{sat}$ of greater than 0.4. In some such aspects, the total partial pressure ratio $P/P^{sat}$ is less than 0.6. In some aspects, the heat removal rate is from $1.50 \times 10^8$ BTU/hr to $2.00 \times 10^8$ BTU/hr. In some aspects, the heat removal rate is greater than $8.00 \times 10^7$ BTU/hr at a condensate circulation rate of greater than 500 gallons per minute (GPM). In some aspects, the heat removal rate is greater than $1.40 \times 10^8$ BTU/hr at a condensate circulation rate of greater than 1500 GPM. In some aspects, the condensate circulation rate is less than 3000 GPM. In some aspects, the heat removal rate is $1.80 \times 10^8$ BTU/hr or less.

At step 46, the technique of FIG. 2 optionally further includes introducing an inert gas into the polymerization reactor 12 to maintain a polymerization reactor pressure. The inert gas is different from the inert condensable gas. For example, the inert gas includes nitrogen. The nitrogen may be introduced in the nitrogen line 24, or directly to the polymerization reactor 12.

At step 48, the technique of FIG. 2 further includes introducing an olefin comonomer into the polymerization reactor 12, and contacting the olefin monomer and the olefin comonomer with the catalyst. The olefin monomer may be introduced via the comonomer line 20. In aspects, the olefin comonomer includes an alpha-olefin including from 3 to 10 carbon atoms. In some such aspects, the comonomer includes one or more of 1-butene, 1-hexene, 1-octene, or decene.

At step 50, the technique of FIG. 2 optionally further includes recycling one or more components, such as one or more of residual unreacted olefin monomer, residual unreacted olefin comonomer, or residual unreacted catalyst, from the product (for example, from the product line 32) to the polymerization reactor 12.

One or more components fed to the polymerization reactor 12 may initially originate from another polymerization system, for example, a co-located system, such as the loop slurry polymerization reactor 34. Such an arrangement may advantageously utilize components from a waste stream of the other polymerization system in the polymerization system 10. For example, one or both of the monomer or the inert condensable agent originate from a co-located loop-slurry polymerization reactor system 34. In some such aspects, the inert condensable agent includes propane or isobutane originating from the co-located loop-slurry polymerization reactor system.

At step 54, the technique of FIG. 2 includes discharging the product from the polymerization reactor. The product may be discharged via product line 32. In some aspects, step 54 may include operating a take-off valve or screw to extract the product from the polymerization reactor 12. In some aspects, the product may be treated in a filter, cyclone, or another separation unit to separate polymer product particles or flakes from unreacted components that may be present in the product, and the unreacted components recycled back to the polymerization reactor (step 50).

While certain steps are serially shown in the flow diagram of FIG. 2, it is understood that the order or the simultaneity of one or more steps may be changed. For example, all steps may occur continuously and substantially simultaneously, and the output of one step may affect the input of another step.

Thus, systems and techniques according to the present disclosure may be used to improve heat removal from gas phase polymerization reactors. The advantages associated with such systems and techniques may include higher heat removal for a given condensed fluid pumping rate, higher heat removal for a given reactor hydrocarbon sorption level in the polymer/flake, and the ability to make productive use of co-located loop reactor waste streams.

EXAMPLES

Example 1

Figure 4:
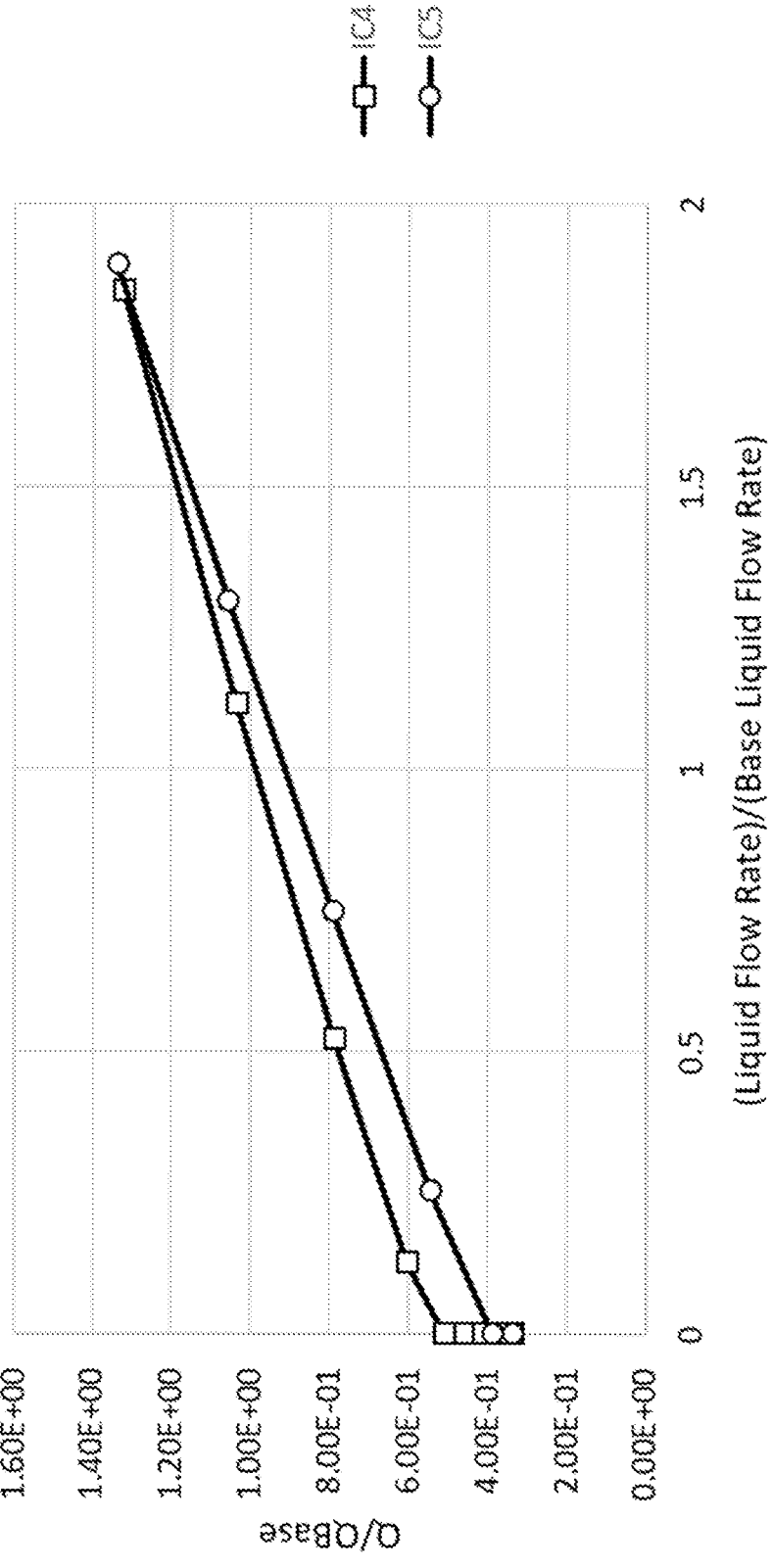
FIG. 4 is a chart showing a relationship between a heat removal ratio and a condensable flow ratio in the simulations of high-density polyethylene production.
Figure 5:
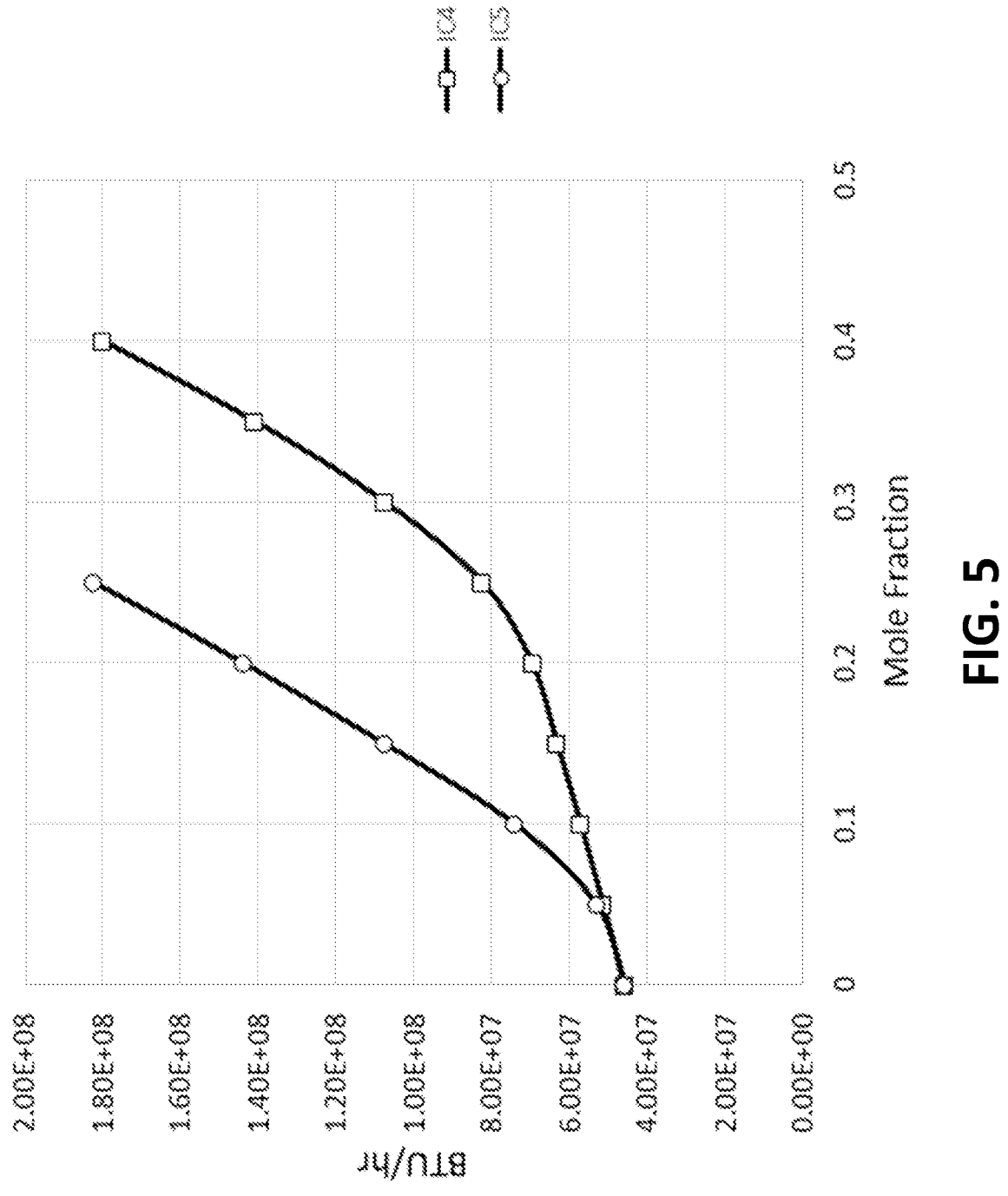
FIG. 5 is a chart showing a relationship between a heat removal rate and a condensable agent mole fraction in the simulations of high-density polyethylene production.
Figure 6:
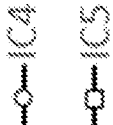
FIG. 6 is a chart showing a relationship between a total partial pressure and a heat removal rate in the simulations of high-density polyethylene production.

Simulations of high-density polyethylene (HDPE) production were conducted, for use of isobutane and isopentane as respective inert condensable agents. The results of the simulations are shown in FIGS. 3 to 6, which compare heat removal for isobutane (IC4) and isopentane (IC5). FIG. 3 is a chart showing a relationship between heat removal rate and condensable flow rate in simulations of high-density polyethylene production using isobutane and isopentane as respective inert condensable agents. As seen in FIG. 3, for a given condensed fluid flow rate, isobutane provides a higher heat removal rate than isopentane, for example, about 10% higher. FIG. 4 is a chart showing a relationship between a heat removal ratio and a condensable flow ratio in the simulations of high-density polyethylene production. As seen in FIG. 4, isobutane can provide a higher heat removal rate ratio than isopentane for a given ratio of liquid flow rate to a base liquid flow rate. FIG. 5 is a chart showing a relationship between a heat removal rate and a condensable agent mole fraction in the simulations of high-density polyethylene production. As seen in FIG. 5, isobutane can be used at a higher mole fraction to provide a given heat removal rate than isopentane. FIG. 6 is a chart showing a relationship between a total partial pressure and a heat removal rate in the simulations of high-density polyethylene production. As seen in FIG. 6, isobutane can provide a higher heat removal rate than isopentane for a given total reactor partial pressure ratio.

Example 2

Figure 7:
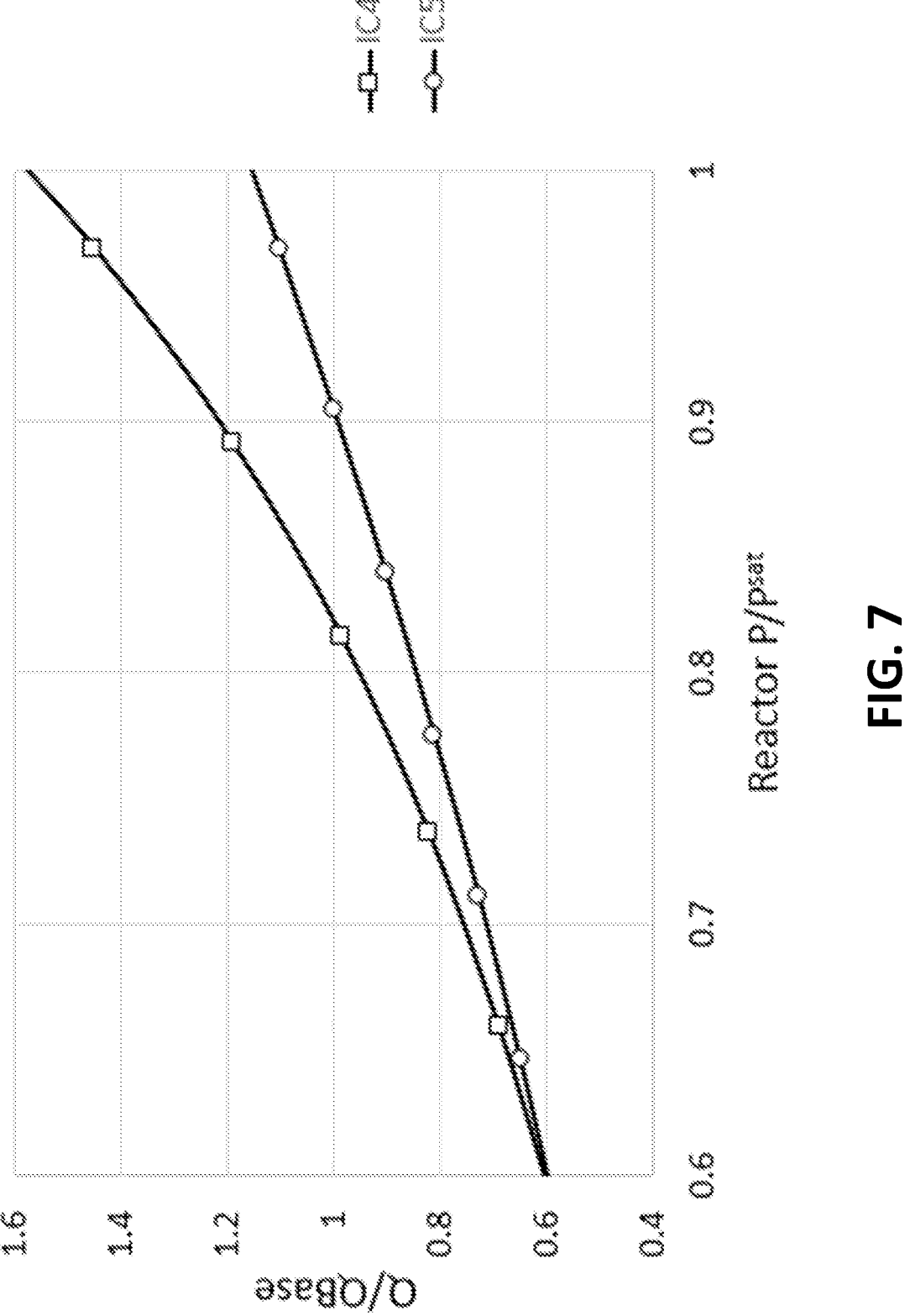
FIG. 7 is a chart showing a relationship between a total partial pressure and a heat removal rate in simulations of linear low-density polyethylene production using isobutane and isopentane as respective inert condensable agents.

FIG. 7 is a chart showing a relationship between a total partial pressure and a heat removal rate in simulations of linear low-density polyethylene production using isobutane and isopentane as respective inert condensable agents. As seen in FIG. 7, isobutane can provide a higher heat removal rate ratio than isopentane for a given total reactor partial pressure ratio.

Example 3

Simulations of LLDPE production were conducted, for a base case using nitrogen, and for cases in which nitrogen was partially or completely replaced with propane. The associated parameters and conditions are shown in TABLE 1.

TABLE 1

|  | Base | All Propane | Partial Propane |
|---|---|---|---|
| Catalyst | Ziegler | Ziegler | Ziegler |
| Comonomer | Hexene | Hexene | Hexene |
| Inert Gas | Nitrogen | C3 | C3 |
| Inert Condensable | n-C5 | C3 | C3 |
| Density, g/cc | 0.9180 | 0.9180 | 0.9180 |
| Reactor Pressure, psig | 325.3 | 325.3 | 325.3 |
| Reactor Temperature, deg F. | 190 | 190 | 190 |
| Reactor Inlet Tempreture, deg F. | 100 | 120 | 110 |
| Gas Composition |  |  |  |
| Hydrogen, mol % | 5.2% | 5.2% | 5.2% |
| Ethylene, mol % | 26.5% | 26.5% | 26.5% |
| Ethane, mol % | 2.5% | 2.5% | 2.5% |
| Propane, mol % | 0.0% | 61.4% | 51.4% |
| Butene, mol % | 0.0% | 0.0% | 0.0% |
| Butane, mol % | 0.0% | 0.0% | 0.0% |
| n-Pentane, mol % | 5.0% | 0.0% | 0.0% |
| Hexene-1, mol % | 4.0% | 4.0% | 4.0% |
| Hexene-2, mol % | 0.3% | 0.3% | 0.3% |
| nHexane, mol % | 0.2% | 0.2% | 0.2% |
| Nitrogen | 56.4% | 0.0% | 10.0% |
| RC6C2, mole ratio | 0.15 | 0.15 | 0.15 |
| RC4C2, mole ratio | 0.00 | 0.00 | 0.00 |
| P/P* (related to sorption) | 0.78 | 0.51 | 0.51 |
| Total Sorbed hydrocarbon, lbs/lb PE | 8% | 4% | 4% |
| Fluidization Velocity, f/s | 2.2 | 2.2 | 2.2 |
| Dewpoint, deg F. | 153 | 161 | 154 |
| Condensation, % | 6.5% | 24.6% | 17.2% |
| Rate, lbs/hr | 70,214 | 148,446 | 123,650 |

As seen in TABLE 1, propane can partially or completely replace nitrogen, while significantly increasing (over doubling, for full replacement by propane) condensation and the production rates.

The invention is described above with reference to numerous aspects and embodiments, and specific examples. Many variations will suggest themselves to those skilled in the art in light of the above detailed description. All such obvious variations are within the full intended scope of the appended claims. Other aspects of the invention can include, but are not limited to, the following aspects. Many aspects are described as "including" certain components or steps, but alternatively, can "consist essentially of" or "consist of" those components or steps unless specifically stated otherwise.

ASPECTS

1. A method of operating a gas phase fluidized bed polymerization reactor system, the method including:

feeding an olefin monomer and a catalyst to a polymerization reactor;

contacting the olefin monomer and the catalyst in a fluidized bed in the polymerization reactor to form a product including a polyolefin;

extracting a heat of polymerization from the polymerization reactor by recycling an inert condensable agent through the fluidized bed and condensing the inert condensable agent; and discharging the product from the polymerization reactor, wherein the inert condensable agent includes one or more of propane, n-butane, or isobutane in a total mole fraction of greater than or equal to 0.50 of the inert condensable agent.

2. The method of aspect 1, where the n-butane or isobutane is present in a total mole fraction of greater than or equal to 0.80 of the inert condensable agent.

3. The method of aspect 2, where the n-butane or isobutane is present in a total mole fraction of greater than or equal to 0.90 of the inert condensable agent.

4. The method of aspect 3, where the n-butane or isobutane is present in a total mole fraction of greater than or equal to 0.95 of the inert condensable agent.

5. The method of aspect 1, where the inert condensable agent is absent of n-butane and isobutane.

6. The method of aspect 1, where the inert condensable agent consists of or consists essentially of propane.

7. The method of any of aspects 1 to 6, where the inert condensable agent includes propane in a mole fraction of greater than or equal to 0.50 of the inert condensable agent.

8. The method of aspect 7, where the inert condensable agent includes propane in a mole fraction of greater than or equal to 0.60 of the inert condensable agent.

9. The method of any of aspects 1 to 8, where the inert condensable agent includes less than 1 parts per million by weight (ppmw) of oxygen.

10. The method of any of aspects 1 to 9, where the inert condensable agent includes less than 5 ppmw of hydrogen.

11. The method of any of aspects 1 to 10, where the olefin monomer includes or is selected from ethylene or propylene.

12. The method of aspect 11, where the olefin monomer consists of or consists essentially of ethylene.

13. The method of any of aspects 1 to 4 or 9 to 11, where the inert condensable agent consists of or consists essentially of isobutane.

14. The method of any of aspects 1 to 13, where no inert agent other than the inert condensable agent is introduced into the polymerization reactor.

15. The method of any of aspects 1 to 14, where the inert condensable agent is absent non-hydrocarbon agents.

16. The method of any of aspects 1 to 15, where the inert condensable agent is absent n-pentane or isopentane.

17. The method of any of aspects 1 to 16, where a heat removal index $Q/Q_{Base}$ is greater than 0.6, where Q is a heat removal capability associated with the inert condensable agent, and $Q_{Base}$ is a heat removal capability associated with a combination of nitrogen and n-pentane sufficient to produce a total partial pressure ratio $P/P^{sat}$ of 0.90.

18. The method of aspect 17, where the heat removal index $Q/Q_{Base}$ is greater than 0.8.

19. The method of aspect 18, where the heat removal index $Q/Q_{Base}$ is greater than 0.9.

20. The method of aspect 18, where the heat removal index $Q/Q_{Base}$ is greater than 1.

21. The method of aspect 20, where the heat removal index $Q/Q_{Base}$ is greater than 1 at a total partial pressure ratio $P/P^{sat}$ of 0.9 or less, where $P/P^{sat}$ is the sum of partial pressures of each condensable hydrocarbon in the polymerization reactor divided by a respective saturation pressure.

22. The method of any of aspects 17 to 21, where the heat removal index $Q/Q_{Base}$ is less than 1.5.

23. The method of any of aspects 1 to 4 and 9 to 22, where the inert condensable agent consists of or consists essentially of isobutane, and wherein a heat removal index $Q_{butane}/Q_{pentane}$ is greater than 1.0 for a condensate circulation rate of less than 2500 gallons per minute (GPM), wherein $Q_{butane}$ is a heat removal capability associated with the inert condensable agent, and $Q_{pentane}$ is a heat removal capability associated with isopentane under the same reaction conditions as isobutane.

25. The method of aspect 24, where the heat removal index $Q_{butane}/Q_{pentane}$ is greater than or equal to 1.1.

26. The method of aspects 24 or 25, where the condensate circulation rate is less than 1500 GPM.

27. The method of aspect 26, where the condensate circulation rate is less than 500 GPM.

28. The method of any of aspects 1 to 27, where a heat removal rate is greater than $1.00 \times 10^8$ BTU/hr at a total partial pressure ratio $P/P^{sat}$ of greater than 0.4.

29. The method of aspect 28, where the total partial pressure ratio $P/P^{sat}$ is less than 0.6.

30. The method of aspect 29, where the heat removal rate is from $1.50 \times 10^8$ BTU/hr to $2.00 \times 10^8$ BTU/hr.

31. The method of any of aspects 1 to 30, where the heat removal rate is greater than $8.00 \times 10^7$ BTU/hr at a condensate circulation rate of greater than 500 gallons per minute (GPM).

32. The method of aspect 31, where the heat removal rate is greater than $1.40 \times 10^8$ BTU/hr at a condensate circulation rate of greater than 1500 GPM.

33. The method of aspects 31 or 32, where the condensate circulation rate is less than 3000 GPM.

34. The method of any of aspects 27 to 33, where the heat removal rate is $1.80 \times 10^8$ BTU/hr or less.

35. The method of any of aspects 1 to 34, further including introducing an inert gas into the polymerization reactor to maintain a polymerization reactor pressure.

36. The method of aspect 35, where the inert gas includes nitrogen.

37. The method of any of aspects 1 to 36, further including introducing an olefin comonomer into the polymerization reactor, and contacting the olefin monomer and the olefin comonomer with the catalyst.

38. The method of aspect 37, where the olefin comonomer includes an alpha-olefin including from 3 to 10 carbon atoms.

39. The method of aspect 38, where the comonomer includes one or more of 1-butene, 1-hexene, 1-octene, or 1-decene.

40. The method of any of aspects 1 to 39, further including recycling one or more of residual unreacted olefin monomer, residual unreacted olefin comonomer, or residual unreacted catalyst from the product to the polymerization reactor.

41. The method of any of aspects 1 to 40, where the polymerization reactor is maintained within a temperature range of 75° C. to 115° C.

42. The method of aspect 41, where the temperature range is 75° C. to 95° C.

43. The method of aspect 42, where the temperature range is 90° C. to 115° C.

44. The method of any of aspects 1 to 43, where the catalyst includes a Ziegler-Natta catalyst, a chromium based catalyst, or a metallocene catalyst.

45. The method of aspect 44, where the catalyst consists of a silica-supported chromium based catalyst.

46. The method of any of aspects 1 to 45, where feeding the catalyst to the polymerization reactor includes feeding a slurry of the catalyst in propane or isobutane to the polymerization reactor.

47. The method of aspect 46, where feeding the catalyst to the polymerization reactor includes continuous injecting of the slurry of the catalyst in propane or isobutane in the polymerization reactor.

48. The method of any of aspects 1 to 47, where one or both of the monomer or the inert condensable agent originate from a co-located loop-slurry polymerization reactor system.

49. The method of aspect 48, where the inert condensable agent includes propane or isobutane originating from the co-located loop-slurry polymerization reactor system.

50. A polymerization system including:
    a gas phase fluidized bed polymerization reactor configured to polymerize an olefin monomer over a catalyst; and
    a source of propane, n-butane, or isobutane fluidically coupled to the gas phase fluidized bed polymerization reactor for introducing one or more of propane, n-butane, or isobutane into the gas phase fluidized bed polymerization reactor as an inert condensable agent.

51. A system including:
    a loop slurry polymerization reactor system including an outlet including isobutane; and
    a gas phase fluidized bed polymerization reactor system configured to polymerize an olefin monomer over a catalyst,
    wherein the outlet of the loop slurry polymerization system is fluidically coupled to the gas phase fluidized polymerization reactor system for introducing isobutane from the loop slurry polymerization system into the gas phase fluidized bed polymerization system as an inert condensable agent.

52. A system including:
    a loop slurry polymerization reactor system including an outlet including propane; and
    a gas phase fluidized bed polymerization reactor system configured to polymerize an olefin monomer over a catalyst,
    wherein the outlet of the loop slurry polymerization system is fluidically coupled to the gas phase fluidized polymerization reactor system for introducing propane from the loop slurry polymerization system into the gas phase fluidized bed polymerization system as an inert condensable agent.

53. A polymerization system including:
    a gas phase fluidized bed polymerization reactor configured to polymerize an olefin monomer over a catalyst;
    a source of propane, n-butane, or isobutane fluidically coupled to the gas phase fluidized bed polymerization reactor for introducing one or more of propane, n-butane, or isobutane into the gas phase fluidized bed polymerization reactor as an inert condensable agent; and
    a controller configured to control the system to:
        feed an olefin monomer and a catalyst to the reactor,
        contact the olefin monomer and the catalyst in a fluidized bed in the reactor to form a product including a polyolefin,
        extract a heat of polymerization from the polymerization reactor by recycling an inert condensable agent through the fluidized bed and condensing the inert condensable agent, and discharge the product from the polymerization reactor, wherein the inert condensable agent includes one or more of propane, n-butane, or isobutane in a total mole fraction of greater than or equal to 0.50 of the inert condensable agent.

54. The system of aspect 53, where the n-butane or isobutane is present in a total mole fraction of greater than or equal to 0.80 of the inert condensable agent.

55. The system of aspect 54, where the n-butane or isobutane is present in a total mole fraction of greater than or equal to 0.90 of the inert condensable agent.

56. The system of aspect 55, where the n-butane or isobutane is present in a total mole fraction of greater than or equal to 0.95 of the inert condensable agent.

57. The system of aspect 53, where the inert condensable agent is absent of n-butane and isobutane.

58. The system of aspect 53, where the inert condensable agent consists of or consists essentially of propane.

59. The system of any of aspects 53 to 58, where the inert condensable agent includes propane in a mole fraction of greater than or equal to 0.50 of the inert condensable agent.

60. The system of aspect 59, where the inert condensable agent includes propane in a mole fraction of greater than or equal to 0.60 of the inert condensable agent.

61. The system of any of aspects 53 to 60, where the inert condensable agent includes less than 1 parts per million by weight (ppmw) of oxygen.

62. The system of any of aspects 53 to 61, where the inert condensable agent includes less than 5 ppmw of hydrogen.

63. The system of any of aspects 53 to 62, where the olefin monomer includes or is selected from ethylene or propylene.

64. The system of aspect 63, where the olefin monomer consists of or consists essentially of ethylene.

65. The system of any of aspects 53 to 56 or 61 to 64, where the inert condensable agent consists of or consists essentially of isobutane.

66. The system of any of aspects 53 to 65, where no inert agent other than the inert condensable agent is introduced into the polymerization reactor.

67. The system of any of aspects 53 to 66, where the inert condensable agent is absent non-hydrocarbon agents.

68. The system of any of aspects 53 to 67, where the inert condensable agent is absent n-pentane or isopentane.

69. The system of any of aspects 53 to 68, where a heat removal index $Q/Q_{Base}$ is greater than 0.6, where Q is a heat removal capability associated with the inert condensable agent, and $Q_{Base}$ is a heat removal capability associated with a combination of nitrogen and n-pentane sufficient to produce a total partial pressure ratio $P/P^{sat}$ of 0.90.

70. The system of aspect 69, where the heat removal index $Q/Q_{Base}$ is greater than 0.8.

71. The system of aspect 70, where the heat removal index $Q/Q_{Base}$ is greater than 0.9.

72. The system of aspect 71, where the heat removal index $Q/Q_{Base}$ is greater than 1.

73. The system of aspect 72, where the heat removal index $Q/Q_{Base}$ is greater than 1 at a total partial pressure ratio $P/P^{sat}$ of 0.9 or less, where $P/P^{sat}$ is the sum of partial pressures of each condensable hydrocarbon in the polymerization reactor divided by a respective saturation pressure.

74. The system of any of aspects 69 to 73, where the heat removal index $Q/Q_{Base}$ is less than 1.5.

75. The system of any of aspects 53 to 56 or 61 to 74, where the inert condensable agent consists of or consists essentially of isobutane, and wherein a heat removal index $Q_{butane}/Q_{pentane}$ is greater than 1.0 for a condensate circulation rate of less than 2500 gallons per minute (GPM), wherein $Q_{butane}$ is a heat removal capability associated with the inert condensable agent, and $Q_{pentane}$ is a heat removal capability associated with isopentane under the same reaction conditions as isobutane.

76. The system of aspect 75, where the heat removal index $Q_{butane}/Q_{pentane}$ is greater than or equal to 1.1.

77. The system of aspects 75 or 76, where the condensate circulation rate is less than 1500 GPM.

78. The system of aspect 77, where the condensate circulation rate is less than 500 GPM.

79. The system of any of aspects 53 to 78, where a heat removal rate is greater than $1.00 \times 10^8$ BTU/hr at a total partial pressure ratio $P/P^{sat}$ of greater than 0.4.

80. The system of aspect 79, where the total partial pressure ratio $P/P^{sat}$ is less than 0.6.

81. The system of aspect 80, where the heat removal rate is from $1.50 \times 10^8$ BTU/hr to $2.00 \times 10^8$ BTU/hr.

82. The system of any of aspects 53 to 81, where the heat removal rate is greater than $8.00 \times 10^7$ BTU/hr at a condensate circulation rate of greater than 500 gallons per minute (GPM).

83. The system of aspect 82, where the heat removal rate is greater than $1.40 \times 10^8$ BTU/hr at a condensate circulation rate of greater than 1500 GPM.

84. The system of aspects 82 or 83, where the condensate circulation rate is less than 3000 GPM.

85. The system of any of aspects 78 to 84, where the heat removal rate is $1.80 \times 10^8$ BTU/hr or less.

86. The system of any of aspects 53 to 85, where the controller is further configured to control the system to introduce an inert gas into the polymerization reactor to maintain a polymerization reactor pressure.

87. The system of aspect 86, where the inert gas includes nitrogen.

88. The system of any of aspects 53 to 87, where the controller is further configured to control the system to introduce an olefin comonomer into the polymerization reactor, and to contact the olefin monomer and the olefin comonomer with the catalyst.

89. The system of aspect 88, where the olefin comonomer includes an alpha-olefin including from 3 to 10 carbon atoms.

90. The system of aspect 89, where the comonomer includes one or more of 1-butene, 1-hexene, 1-octene, or 1-decene.

91. The system of any of aspects 53 to 90, where the controller is further configured to control the system to recycle one or more of residual unreacted olefin monomer, residual unreacted olefin comonomer, or residual unreacted catalyst from the product to the polymerization reactor.

92. The system of any of aspects 53 to 91, where the controller is configured to control the system to maintain the polymerization reactor within a temperature range of 75° C. to 115° C.

93. The system of aspect 92, where the temperature range is 75° C. to 95° C.

94. The system of aspect 93, where the temperature range is 90° C. to 115° C.

95. The system of any of aspects 53 to 94, where the catalyst includes a Ziegler-Natta catalyst, a chromium based catalyst, or a metallocene catalyst.

96. The system of aspect 95, where the catalyst consists of a silica-supported chromium based catalyst.

97. The system of any of aspects 53 to 96, where the controller is configured to control the system to feed the catalyst to the polymerization reactor by feeding a slurry of the catalyst in propane or isobutane to the polymerization reactor.

98. The system of aspect 97, where the controller is configured to control the system to feed the catalyst to the polymerization reactor by continuous injecting of the slurry of the catalyst in propane or isobutane in the polymerization reactor.

99. The system of any of aspects 53 to 98, where one or both of the monomer or the inert condensable agent originate from a co-located loop-slurry polymerization reactor system.

100. The system of aspect 99, where the inert condensable agent includes propane or isobutane originating from the co-located loop-slurry polymerization reactor system.

We claim:

1. A method of operating a gas phase fluidized bed polymerization reactor system, the method comprising:

feeding an olefin monomer and a catalyst to a polymerization reactor;

contacting the olefin monomer and the catalyst in a fluidized bed in the polymerization reactor to form a product comprising a polyolefin;

extracting a heat of polymerization from the polymerization reactor by recycling an inert condensable agent through the fluidized bed and condensing the inert condensable agent, wherein a heat removal rate is greater than $1.00 \times 10^8$ BTU/hr at a total partial pressure ratio $P/P^{sat}$ of greater than 0.4; and discharging the product from the polymerization reactor, wherein the inert condensable agent comprises one or more of propane, n-butane, or isobutane in a total mole fraction of greater than or equal to 0.50 of the inert condensable agent.

2. The method of claim 1, wherein the n-butane or isobutane is present in the inert condensable agent in a total mole fraction of greater than or equal to 0.90 of the inert condensable agent.

3. The method of claim 1, wherein the inert condensable agent is absent of n-butane and isobutane.

4. The method of claim 1, wherein the inert condensable agent consists of or consists essentially of propane.

5. The method of claim 1, wherein the inert condensable agent comprises propane in a mole fraction of greater than or equal to 0.50 of the inert condensable agent.

6. The method of claim 5, wherein the inert condensable agent comprises propane in a mole fraction of greater than or equal to 0.60 of the inert condensable agent.

7. The method of claim 1, wherein the inert condensable agent comprises less than 1 parts per million by weight (ppmw) of oxygen and less than 5 ppmw of hydrogen.

8. The method of claim 1, wherein the olefin monomer is selected from ethylene or propylene.

9. The method of claim 8, wherein the olefin monomer consists of or consists essentially of ethylene.

10. The method of claim 1, wherein the inert condensable agent consists of or consists essentially of isobutane.

11. The method of claim 1, wherein no inert agent other than the inert condensable agent is introduced into the polymerization reactor.

12. The method of claim 1, wherein the inert condensable agent is absent non-hydrocarbon agents.

13. The method of claim 1, wherein the inert condensable agent is absent n-pentane or isopentane.

14. The method of claim 1, wherein a heat removal index $Q/Q_{Base}$ is greater than 1.0, wherein Q is a heat removal capability associated with the inert condensable agent, and $Q_{Base}$ is a heat removal capability associated with a combination of nitrogen and n-pentane sufficient to produce a total partial pressure ratio $P/P^{sat}$ of 0.90.

15. The method of claim 14, wherein the heat removal index $Q/Q_{Base}$ is greater than 1 at a total partial pressure ratio $P/P^{sat}$ of 0.9 or less, where $P/P^{sat}$ is the sum of partial pressures of each condensable hydrocarbon in the polymerization reactor divided by a respective saturation pressure.

16. The method of claim 1, wherein the inert condensable agent consists of or consists essentially of isobutane, and wherein a heat removal index $Q_{butane}/Q_{pentane}$ is greater than 1.0 for a condensate circulation rate of less than 2500 gallons per minute (GPM), wherein $Q_{butane}$ is a heat removal capability associated with the isobutane inert condensable agent, and $Q_{pentane}$ is a heat removal capability associated with isopentane under the same reaction conditions as isobutane.

17. The method of claim 16, wherein the condensate circulation rate is less than 1500 GPM.

18. The method of any claim 1, wherein the heat removal rate is greater than $8.00 \times 10^7$ BTU/hr at a condensate circulation rate of greater than 500 gallons per minute (GPM).

19. The method of claim 1, further comprising introducing nitrogen as an inert gas into the polymerization reactor to maintain a polymerization reactor pressure.

20. The method of claim 1, further comprising introducing an olefin comonomer into the polymerization reactor, and contacting the olefin monomer and the olefin comonomer with the catalyst.

21. The method of claim 20, wherein the comonomer comprises one or more of 1-butene, 1-hexene, 1-octene, or 1-decene.

22. The method of claim 1, further comprising recycling one or more of residual unreacted olefin monomer, residual unreacted olefin comonomer, or residual unreacted catalyst from the product to the polymerization reactor.

23. The method of claim 1, wherein the catalyst comprises a Ziegler-Natta catalyst, a chromium based catalyst, or a metallocene catalyst.

24. The method of claim 23, wherein the catalyst consists of a silica-supported chromium based catalyst.

25. The method of claim 1, wherein one or both of the monomer or the inert condensable agent originate from a co-located loop-slurry polymerization reactor system.

* * * * *